United States Patent [19]

Eubanks et al.

[11] 4,359,911
[45] Nov. 23, 1982

[54] NON-WELDED STEERING WHEEL AND METHOD OF MANUFACTURE

[75] Inventors: Kenneth B. Eubanks, Dayton; Clifford E. Loeb, Brookville, both of Ohio

[73] Assignee: General Motors Corporation, Detroit, Mich.

[21] Appl. No.: 187,812

[22] Filed: Sep. 16, 1980

Related U.S. Application Data

[63] Continuation of Ser. No. 967,288, Dec. 7, 1978, abandoned.

[51] Int. Cl.³ .............................................. B62D 1/04
[52] U.S. Cl. .................................. 74/552; 29/159 B; 403/284
[58] Field of Search ..................... 74/552; 29/159 B; 403/274, 284

[56] References Cited

U.S. PATENT DOCUMENTS

| 1,869,333 | 7/1932 | Bronson et al. | 74/552 |
| 2,408,388 | 10/1946 | George | 74/552 |
| 2,425,240 | 8/1947 | George | 74/552 |
| 4,010,658 | 3/1977 | Muller et al. | 74/552 |
| 4,011,645 | 3/1977 | Muller | 29/159 B |

FOREIGN PATENT DOCUMENTS 776976 10/1933 France .................................. 74/552

Primary Examiner—Kenneth Dorner
Attorney, Agent, or Firm—Herbert Furman

[57] ABSTRACT

A steering wheel includes a stamped body portion including a hub and a pair of spoke members having terminal portions integrally riveted to a split rim member and wrapped thereabout. One of the terminal portions is secured to the split portion of the rim member and the other is secured to an unsplit portion. The steering wheel is manufactured by forming the terminal portions with an intermediate flange and a terminal flange, locating the rim member at the juncture of the flanges, with the split of the rim member within the extent of one of the terminal flanges, piercing the terminal flange to either side of the split, piercing the other terminal flange, extruding portions of the rim member into the pierced openings to integrally rivet the rim member to the terminal portion and wrapping the terminal flanges over the recesses in the rim member resulting from the extrusion to clamp the rim member and terminal portions to each other.

2 Claims, 9 Drawing Figures

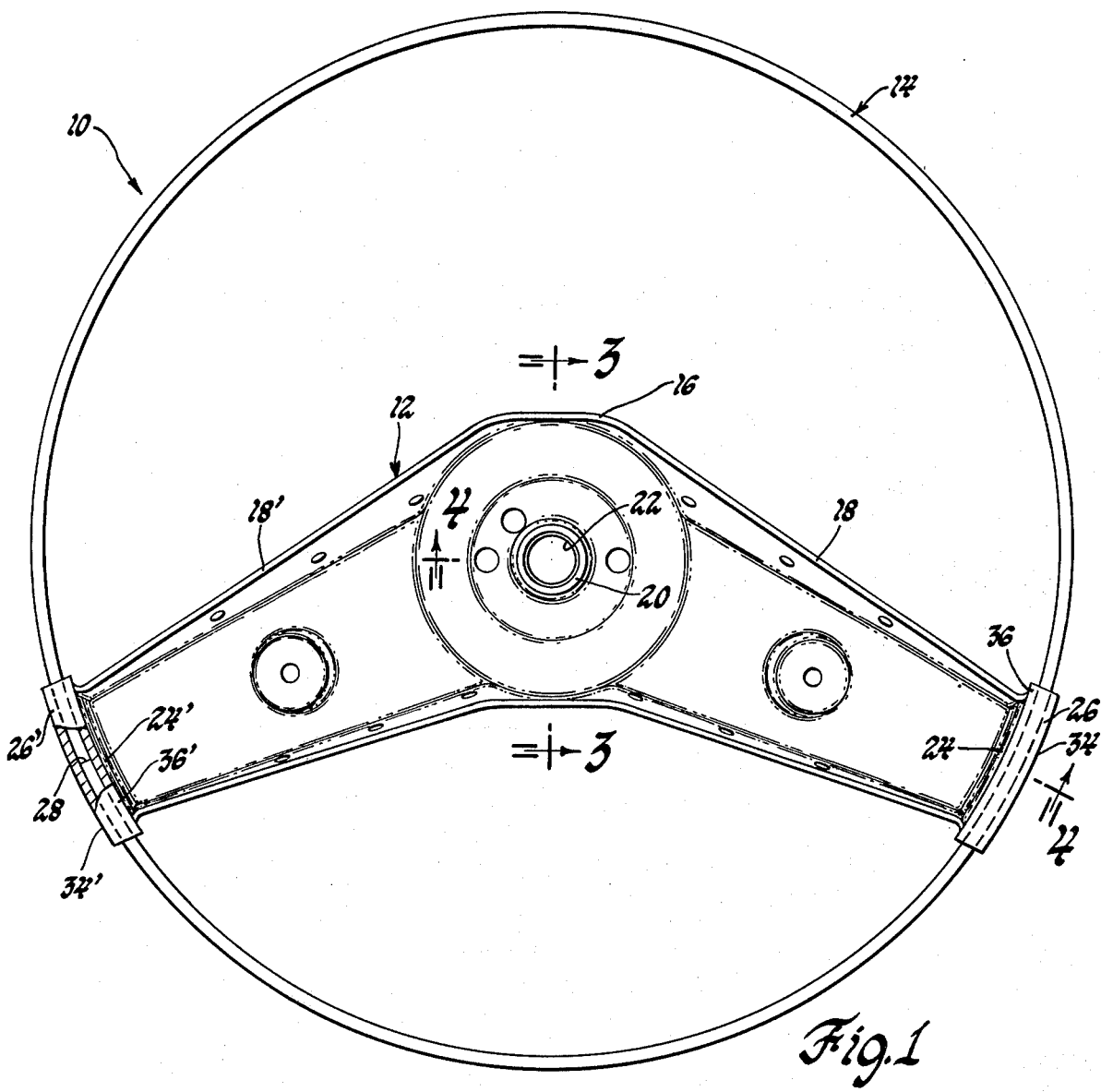
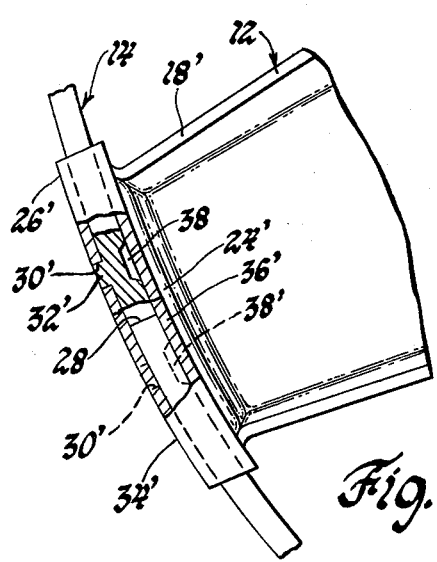
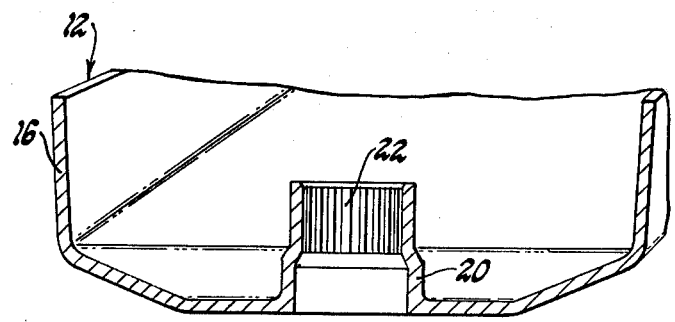

NON-WELDED STEERING WHEEL AND METHOD OF MANUFACTURE

This is a continuation of application Ser. No. 967,288 filed Dec. 7, 1978, now abandoned.

This invention relates generally to steering wheels and more particularly to a non-welded steering wheel and method of manufacture thereof.

Conventionally, steering wheels include a body portion having a hub portion and spoke portions, and a continuous rim portion which is secured to the spoke portions. The hub portion is normally formed in one or more pieces and then riveted or welded to the body portion. The rim portion is normally formed as a butt-welded circular ring which is welded to the ends of the spoke portions.

The steering wheel of this invention includes a body portion having a hub portion and integral spoke portions. The rim is formed as a split circular ring which is secured to the spoke portions by integrally riveting the rim to the spoke portions and wrapping flange portions of the spoke portions over the integrally riveted rim.

In the preferred embodiment of the invention, the spoke portions are each formed with an intermediate flange and a terminal flange, with the terminal flange being provided with spaced openings. The rim, in the form of a split circular ring, is located at the junctures of the intermediate and terminal flanges, with the split being located generally centrally of one terminal flange and intermediately of at least a pair of the openings therein. Thereafter the rim is integrally riveted to both terminal flanges by extruding portions of the rim into the openings thereof. The terminal flanges are then wrapped over the rim and over the recesses resulting from the extrusions whereby the rim and spoke portions are secured both by the integral rivets and by clamping.

Thus, no portion of the steering wheel of this invention is of welded construction. The body portion and the rim, both in their individual manufacture and in the assembly process are secured to each other by conventional stamping and die operations.

The primary feature of this invention is that it provides a steering wheel having both spokes and a rim secured to each other through the use of non-welded operations. Another feature is that the spokes and rim are both integrally riveted and clamped to each other. A further feature is that the rim is in the form of a split circular ring and is integrally riveted to one of the spokes to either side of the split therein. Yet another feature is that the spokes are formed with angularly related intermediate and terminal flanges which support the rim during assembly, with the terminal flanges being provided with a plurality of openings which receive integral rivet extrusions of the rim. Still another feature is that the terminal flanges are thereafter wrapped over the rim and also over the recesses in the rim resulting from the extrusions to clamp the spoke and rim to each other.

These and other features will be readily apparent from the following specifications and drawings wherein:

FIG. 1 is a partially broken away plan view of a steering wheel according to the invention;

FIG. 2 is an enlarged broken away view of a portion of FIG. 1;

FIG. 3 is a sectional view taken generally along line 3—3 of FIG. 1;

Figure 4:
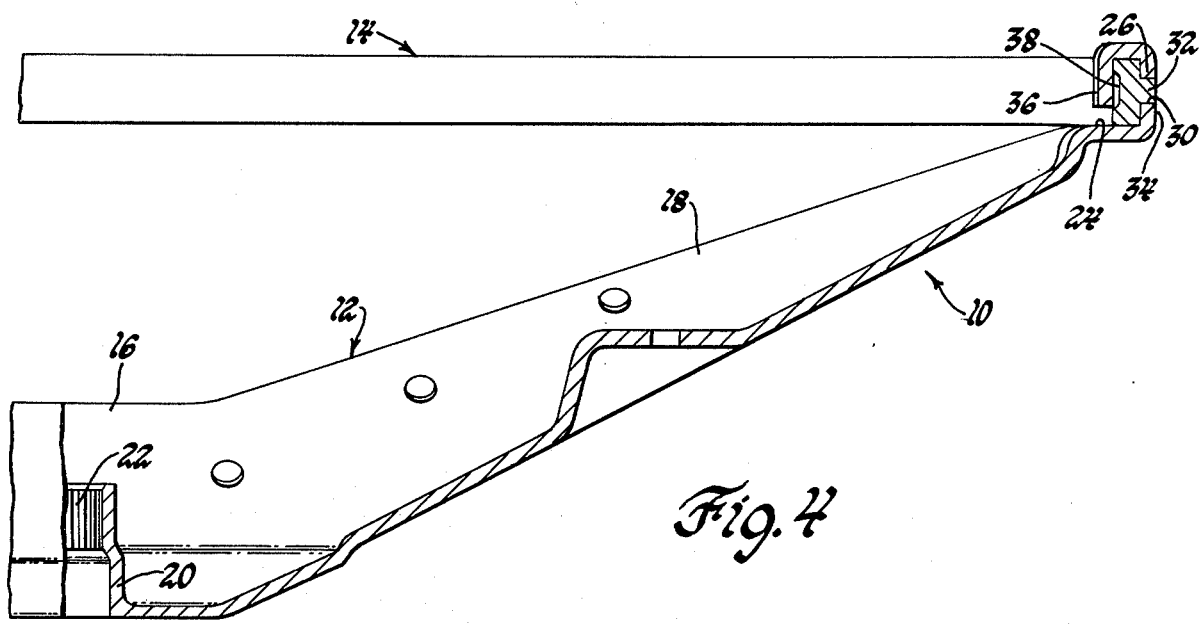
FIG. 4 is a sectional view taken generally along line 4—4 of FIG. 1.

FIGS. 5-9, inclusive, show various stages in the manufacture of the steering wheel.

Referring now to FIG. 1 of the drawings, a steering wheel 10 according to the invention includes a body portion 12 and a split rim 14. The body portion 12 includes an integral hub portion 16 and a pair of like spokes 18 and 18' of generally shallow arcuate cross-sectional configuration. As shown in FIG. 3, the integral hub portion 16 includes a central upwardly extending boss 20 having an internally splined portion 22 of slightly smaller diameter. The portion 22 receives the upper splined end of a conventional steering shaft in order to secure the steering wheel to such shaft. Such structure is not shown since it is conventional.

As shown in FIG. 4, the spoke 18 includes an intermediate flange portion 24 of generally planar shape and a terminal flange portion 26 of generally U-shape. Spoke 18' includes like flange portions 24' and 26'. The rim 14 is clamped within the flange portions 24, 24' and 26, 26' as shown.

Referring now to FIGS. 1 and 2 of the drawings, the split 28 in the rim 14 is located generally centrally or intermediately of the flange portions 24' and 26' of the one spoke 18'. It will be noted that the flange portions cover the rim 14 to either side of the split 28. Likewise the flange portions 24 and 26 of the other spoke 18 cover an unsplit portion of the rim 14. The flange portion 26' to either side of the split 28 is provided with a pair of openings 30' and likewise the flange portion 26 is provided with a similar pair of openings 30 which are spaced approximately the same distance as the openings 30'. As shown in FIGS. 2 and 4 integral portions 32' and 32 of the rim 14 are extruded radially outwardly and into the openings 30' and 30, respectively, generally flush with the radially outer walls 34' and 34 of flange portions 26' and 26. The extrusions provide integral rivets securing the split end portions and an unsplit portion of the rim 14 to the spokes 18' and 18. It will be noted that the radially inner walls 36' and 36 of flange portions 26' and 26 extend partially over the rim 14 and generally over the recesses 38 which result from the extrusions of portions 32' and 32 so that the rim 14 is both integrally riveted to each of the spokes 18' and 18 and also clamped thereto provide for secure attachment of the rim and spokes to each other.

The method of manufacturing the steering wheel 10 is shown in FIGS. 5-9, inclusive, and will now be described with reference to spoke 18. It will be understood that spoke 18' is simultaneously formed with spoke 18 and simultaneously secured to rim 14.

Figure 5:
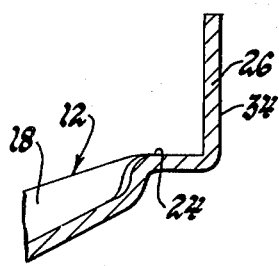
Figure 6:
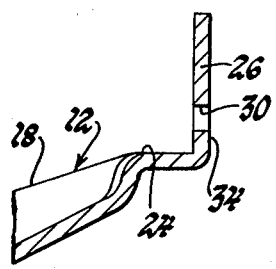
Figure 7:
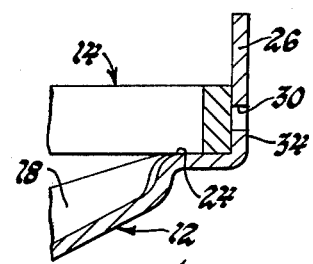
Figure 8:
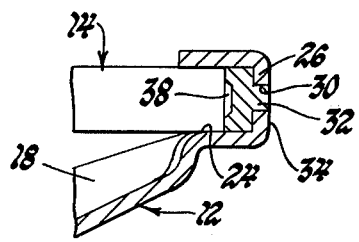
Figure 9:
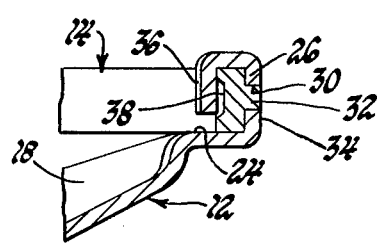

As shown in FIG. 5, the spokes 18 and 18' are initially formed with the intermediate flange portions 24 and 24' and the terminal flange portions 26 and 26' generally normal to each other. Thereafter as shown in FIG. 6, the flange portions 26 and 26' are pierced in at least two spaced locations to provide the pairs of openings 30 and 30'. The rim 14 is then located at the junctures of the flange portions 24 and 26 and 24' and 26' as shown in FIG. 7. The split 28 of the rim is located generally intermediately of the flange portions 24' and 26' and intermediately of the openings 30' of the flange portion 26'. As shown in FIG. 8, the integral portions 32 and 32' of the rim 14 are then extruded radially outwardly into the openings 30, 30' to provide pairs of integral rivets securing the rim 14 to each of the spokes 18 and 18'. Either concurrently with such extrusion or in a subsequent step, the flange portions 26 and 26' are partially wrapped over the rim 14 as shown in FIG. 8. Subsequently, as shown in FIG. 9, the flange portions 26, 26' are completely wrapped over the rim 14 so that the radially inner walls 36 and 36' of such flange portions extend at least partially over the recesses 38 in order to clamp the rim 14 to the spokes 18 and 18'. It is desirable that the extrusions 32, 32' be flush with the radially outer walls 34, 34' of the flange portions 26 and 26' although a shallow recess in the openings 30, 30' is of little consequence.

Thus this invention provides an improved non-welded steering wheel and method of manufacture.

The embodiments of the invention in which an exclusive property or privilege is claimed are defined as follows:

1. A non-welded steering wheel comprising, in combination, a split generally circular rim having a solid cross-section, a body portion including at least one spoke having an integral generally planar intermediate flange and an angularly related integral U-shape terminal flange including spaced openings in a portion thereof, said intermediate and terminal flanges forming an integral one piece unit with said spoke, the portions of the rim on each side of the split seating against the intermediate flange and against the portion of the terminal flange including the spaced openings, the terminal flange being wrapped around the portions of the rim on each side of the split, the terminal flange and intermediate flange substantially encircling such portions of the rim and clamping such portions to the intermediate flange and terminal flange, the portions of the rim on each side of the split being extruded from one side thereof through the rim and outwardly of an opposite side thereof, and completely within the openings of the terminal flange to provide integral rivets which integrally rivet such portions of the rim to the terminal flange and cooperate with the clamping of such portions to the intermediate flange and terminal flange in securing the rim to the spoke in a non-welded manner.

2. A non-welded steering wheel comprising, in combination, a split generally circular rim having a solid multi-face cross-section, a body portion including at least one spoke having an integral generally planar intermediate flange and an angularly related integral U-shape terminal flange including spaced openings in a portion thereof, said intermediate and terminal flanges forming an integral one piece unit with said spoke, the portions of the rim on each side of the split seating against the intermediate flange and having one face thereof seating against the portion of the terminal flange including the spaced openings, the terminal flange being wrapped around the portions of the rim on each side of the split, the terminal flange and intermediate flange substantially encircling such portions of the rim and clamping such portions to the intermediate flange and terminal flange, the portions of the rim on each side of the split being extruded from another face thereof through the rim and outwardly of the one face thereof, and completely within the openings of the terminal flange to provide integral rivets which integrally rivet such portions of the rim to the terminal flange and cooperate with the clamping of such portions to the intermediate flange and terminal flange in securing the rim to the spoke in a non-welded manner.

* * * * *